United States Patent [19]

Sifferman et al.

[11] 4,110,275

[45] Aug. 29, 1978

[54] CONTROL OF INCOMPETENT FORMATIONS WITH THICKENED ACID-SETTABLE RESIN COMPOSITIONS

[75] Inventors: Thomas R. Sifferman; Derry D. Sparlin, both of Ponca City, Okla.

[73] Assignee: Continental Oil Company, Ponca City, Okla.

[21] Appl. No.: 815,623

[22] Filed: Jul. 14, 1977

Related U.S. Application Data

[62] Division of Ser. No. 739,216, Nov. 5, 1976, Pat. No. 4,085,801.

[51] Int. Cl.$^2$ .......................... C08L 1/16; E21B 33/13
[52] U.S. Cl. ...................................... 260/14; 166/276; 166/295; 260/13; 260/16
[58] Field of Search ............... 166/294, 295, 292, 300; 252/8.5 M, 8.55 R; 260/13, 14, 16

[56] References Cited

U.S. PATENT DOCUMENTS

| 3,378,071 | 4/1968 | Sparlin | 166/295 |
| 3,391,738 | 7/1968 | Sparlin | 166/295 |
| 3,692,116 | 9/1972 | Sparlin | 166/295 |
| 3,726,796 | 4/1973 | Schweiger | 252/8.5 M |
| 3,776,311 | 12/1973 | Carnes et al. | 166/295 |

*Primary Examiner*—Herbert B. Guynn
*Attorney, Agent, or Firm*—A. Joe Reinert

[57] ABSTRACT

A method and composition is provided for positioning a polymeric material having particulate matter disposed therein in a subterranean formation penetrated by a wellbore. The composition consists essentially of a hydrocarbon oil, a quaternary salt of an essentially undegraded, cellulose sulfate, solid particulate matter in an amount equal to from about 0.25 to about 22 pounds of particulate matter per gallon of hydrocarbon oil and an acid-settable thermosetting resin in an amount equal to from about 0.1 to about 5.0 gallons per cubic foot of particulate material. The composition is placed in contact with a subterranean formation in a wellbore by a method comprising injecting a first mixture consisting essentially of said quaternary salt of an essentially undegraded cellulose sulfate mixed with hydrocarbon oil followed by the injection of the composition with a post injection of an additional quantity of the quaternary salt in oil.

10 Claims, No Drawings

CONTROL OF INCOMPETENT FORMATIONS WITH THICKENED ACID-SETTABLE RESIN COMPOSITIONS

This is a division of application Ser. No. 739,216, filed Nov. 5, 1976 now U.S. Pat. No. 4,085,801.

BACKGROUND OF THE INVENTION

This invention relates to control of incompetent subterranean formations penetrated by wellbores.

In the production of fluids, such as oil, gas, water, etc, from subterranean formations, a number of difficulties are encountered when the well through which the fluids are produced penetrates an incompetent or unconsolidated subterranean formation. Such formations frequently are composed of incompetent sand, and the grains of the sand become entrained in the fluid being produced and are carried into the wellbore. The result of such entrainment, among other things, is the abrasion of the pumping equipment in the wellbore, clogging of the strainers, sand bridging in the tubing, plugging of surface flow lines, filling of oil-water separators, and the sanding in of the cavity immediately adjacent the strainers. These results, in turn, ultimately cause a sharp decrease in the rate of production of hydrocarbon fluids and increased maintenance costs.

Various solutions to this problem have been proposed. For example, gravel and sand packs employing the injection of particulate solids in thickened hydrocarbons wherein the thickening agent is an aluminum soap of fatty acids, finely-divided silica, bentonite, certain other soaps (NAPALM) and the like have been employed as are disclosed by U.S. Pat. Nos. 2,906,338, 2,978,024, 3,498,380 and 3,064,730.

One of the more successful solutions to the incompetent formation problem has been the use of polymeric resins for injection into the wellbore in combination with solid particulate matter to form a consolidated area adjacent the wellbore in the sand producing zone. Such techniques are shown in U.S. Pat. No. 3,378,071, patented Apr. 16, 1968, by Derry D. Sparlin and assigned to Continental Oil Company as well as U.S. Pat. No. 3,692,116 by Derry Sparlin and assigned to Continental Oil Company. U.S. Pat. No. 3,378,071 and U.S. Pat. No. 3,692,116 are hereby incorporated by reference.

Gelled water systems are presently used for placing gravel and plastic against subterranean formations for controlling incompetent sand. It is desirable in many instances to use a gelled oil system in many formations wherein the oils are more compatible with the subterranean environment than water. Water in some formations impairs the production of fluids from the well by forming emulsions with the oil in the formation, hydrating shales or clays in the formation and the like. Gelled oil prevents these problems and is diluted by the produced crude oil which facilitates the initial production of oil from the well after well treatment.

A further patent relating to a similar process is U.S. Pat. No. 3,391,738, patented July 9, 1968, by Derry D. Sparlin and assigned to Continental Oil Company. U.S. Pat. No. 3,391,738 is hereby incorporated by reference.

In such processes, the mixture injected into the formation to consolidate the portions of the subterranean formations surrounding the wellbore comprises a polymeric resin which polymerizes in situ and, in many instances, contains particulate material. In the use of such processes, it has long been considered desirable that a gelled oil, or the like, be available for suspending the sand and unpolymerized resins during injection into the wellbore. Such a gelled oil has been unavailable to the art heretofore, since the gelling agents commonly used have been found to be incompatible with the polymeric resins injected. As a result, the art has used viscous oils and the like to suspend the particulate matter in solution with the polymeric resins.

The use of viscous oils and the like results in difficulty in removing the viscous oil from the formation once the resins have polymerized. Accordingly, considerable time has been devoted to attempted development of gelled oil mixtures which are capable of suspending the particulate matter for injection into the wellbore in solution with the polymeric resins without adversely affecting the performance of the resins.

OBJECTS OF THE INVENTION

An object of the invention is to control an incompetent formation.

A further object is to overcome deficiencies in prior art methods of controlling incompetent formations.

A further object is to provide gelled compositions for controlling incompetent formations.

These, and other objects and advantages will appear from the following description of the embodiments of the invention, and the most novel features, will be particularly pointed out hereinafter in connection with the appended claims.

SUMMARY OF THE INVENTION

Such objectives are achieved by the use of a composition for positioning a polymeric material having particulate matter disposed therein contacting a subterranean formation penetrated by a wellbore wherein the composition consists essentially of (a) a hydrocarbon oil, (b) a quaternary ammonium salt of cellulose sulfate., the quaternary group of said quaternary salt of cellulose sulfate containing at least 16 carbon atoms and being present in said composition in an amount sufficient to produce a minimum apparent viscosity in said composition of at least 50 cps but less than 5000 cps at the injection temperature and pressure, and an apparent viscosity in said composition at bottom hole conditions of at least 25 cps;

(c) finely-divided particulate material in an amount equal to from about 0.25 to about 22 pounds of particulate material per gallon of said oil; and, (d) an acid-settable liquid thermosetting resin in an amount equal to from about 0.1 to about 5.0 gallons per ft$^3$ of said particulate material.

Quaternary salts of cellulose sulfates are effective in gelling hydrocarbon oils for use in suspending finely-divided solid particulate matter for injection into subterranean formations, and quaternary salts of cellulose sulfates also have a beneficial effect upon the resins used to form the solid organic polymeric material in the subterranean formation when the resins are chosen from the group consisting of acid-settable liquid thermosetting resins.

DESCRIPTION OF THE PREFERRED EMBODIMENTS

Some suitable resins are disclosed in U.S. Pat. No. 3,391,738 incorporated herein by reference, especially in Columns 3 through 7. Some preferred resins are acid-settable polyepoxides, acid-settable polyesters, phenolic novolacs, hydroxy aryl-aldehydes, furans, furfuryl alcohol resins, and acid-settable polyurethanes. Of these, the phenolic novolacs, hydroxy aryl-aldehydes, furans, and furfuryl alcohol resins are preferred. The resin is desirably present in an amount equal to from about 0.1 to 5.0 gallons per ft$_3$ of solid particulate material. Very desirable results are obtained when about 1.0 to 2.0 gallons per ft$^3$ of solid particulate matter is used.

The resin may be added in a diluted form containing from 10 to 90 percent inert diluent. The amounts of resin stated above refer to 100 percent resin and reactive resin components and do not include the inert diluents.

In the practice of the present invention from about 0.25 to about 22 pounds of solid particulate material per gallon of oil is useful with the more commonly used ranges varying from about 10 to about 15 pounds of solid particulate material per gallon of oil.

The quaternary salts of cellulose sulfate are desirably present in an amount sufficient to result in an apparent viscosity of the composition at surface conditions of at least about 50 cps but not more than 5000 cps. At least 50 cps viscosity is desirable to maintain the particulate matter in suspension, but above about 5000 cps, it becomes difficult to handle the composition. The slurry can be heated at the surface to reduce its viscosity so that it can be easily pumped and will have the desired viscosity at the bottom of a hot well. As the slurry is pumped into contact with the subterranean formation, the geothermal temperature increases, causing a reduction in viscosity. Desirably, the composition has a minimum viscosity of at least about 25 cps at bottom-hole conditions in order that the solid particulate matter may be adequately suspended in the composition. Such is necessary to insure that the solid particulate matter, which in many instances is sand, is adequately suspended as it is packed contacting the formation around the wellbore. The concentration of quaternary salt required to obtain the desired viscosity will vary with the physical and chemical properties of the oil and the like and thus must be determined for the specific oil used. Such determinations are well within the skill of those in the art; however, in many instances, concentrations from about 0.03 to about 5.0 weight percent quaternary salt based on the weight of the composition will be found effective.

The viscosity of the oil gelled with quaternary salt is reduced by the addition of acid in combination with time and temperature. Accordingly, those skilled in the art may readily determine the concentration and type of acids required to maintain the proper oil viscosity for the time interval necessary to carry the sand and resin slurry into contact with the formation and cause an oil viscosity reduction to occur subsequently during the time interval necessary for the resin to harden but before the well is put on production. In some instances, especially where relatively low subterranean temperatures (below 150° F.) exist in the producing interval, additional acid may be injected to aid in rapid hardening of the plastic and reduction of oil viscosities. Oil soluble acids, such as trichloroacetic acid, aluminum chloride red oil, and the like may be used. The slurry of resin, sand, and gelled oil may be intentionally prepared and pumped without acid catalysts or with insufficient catalyst to cause the resin to harden, and thereafter an oil soluble acid or acid oil may be pumped into the resin-sand mass to catalyze the polymerization of the resin and reduce the oil viscosity. Numerous such variations and modifications are possible within the scope of the present invention.

The hydrocarbon oil employed can be any suitable refined or crude oil stream, such as diesel oil, kerosene, light crude, distillates, and the like. It is, however, desirable that the oil be substantially neutral.

The finely-divided solid particulate material used, in many instances, will be sand. The sand is normally in a finely-divided form, such as for instance, of a U.S. standard mesh size between 10 and 100. Other materials which may be used include nutshells, peach pits, brittle synthetic resins, gilsonite, coke, and similar solid material.

It is often desirable that the mixture which is contacted with the incompetent formation contain a coupling agent. The coupling agent can be any material known to promote adhesion of an organic polymer to mineral matter. In particular, anyone or combination of the coupling agents disclosed by U.S. Pat. No. 3,285,339 (herein incorporated by reference) can be employed. A particularly presently preferred coupling agent is gamma aminopropyltriethoxysilane. Often in the range of about 0.002 to 0.04 parts by weight of coupling agent can be employed for each part by weight of organic polymer. Below about 0.002 parts by weight of coupling agent is largely ineffective while quantities above about 0.04 parts by weight become uneconomic. More preferably, in the range of about 0.01 to 0.02 parts by weight of coupling agent are employed for each part by weight of organic polymer to provide optimum effectiveness at an economically feasible cost.

The quaternary ammonium cellulose sulfate salts are prepared by means known to those skilled in the art, such as disclosed, for instance, in U.S. Pat. No. 3,726,796, issued Apr. 10, 1973, to Schweiger and assigned to Kelco Company. U.S. Pat. No. 3,726,796 is hereby incorporated by reference.

The quaternary ammonium cellulose sulfate salts are derivatives of a colloidal cellulose sulfate having a degree of substitution (D.S.) of at least about 2, e.g., such as 1.8; having a viscosity in excess of 20 cps at a one percent concentration in an aqueous media as measured by a Brookfield Synchro-Lectric Viscometer, Model LVF, at 60 rpm and a temperature of 25° C. and being further characterized as reactive with potassium ions in aqueous media to form a thermoreversible gel. The quaternary ammonium salt which is reacted with the colloidal cellulose sulfate contains four organic radicals attached to the nitrogen atom. The number of carbon atoms present in all of the organic substituent groups should total about 16 or more in order to impart suitable solubility characteristics to the resulting quaternary ammonium salt of the cellulose sulfate.

The reaction to form the quaternary ammonium cellulose sulfate salt is conducted in the presence of water, and there is optionally present a lower alcohol. A preferred lower alcohol is methanol since it is quite miscible with water and is cheap and readily available. The reaction is generally conducted by dissolving in water, preferably at a pH of about 7 or higher, a water-soluble salt of the colloidal cellulose sulfate after which there is optionally added a lower alcohol followed by the addition of a quaternary ammonium salt. The reaction may be conducted at room temperature or higher temperatures such as about 50° C. to 70° C. and preferably with agitation of the reaction mixture. The reaction goes almost instantaneously to give a nearly quantitative yield of the quaternary ammonium derivative of the colloidal cellulose sulfate. The product precipitates from the mother liquor and is removed and is then washed and dried.

The colloidal cellulose sulfate reactant used in the reaction may be a water-soluble salt of cellulose sulfate, such as the sodium, ammonium, lithium, or potassium salt. The nature of the ion, such as sodium, which is present in the cellulose sulfate starting material can, of course, be varied so long as the cellulose sulfate salt is water soluble. The quaternary ammonium reactant is preferably a halogen salt, such as a chloride, bromide, or an iodide.

If desired, the quaternary ammonium salts of the colloidal cellulose sulfate may be formed by reaction of the free sulfuric acid ester of the colloidal cellulose sulfate rather than reaction of a water-soluble salt thereof. When the cellulose sulfate reactant is in the form of the free sulfuric acid ester, the quaternary ammonium ion is supplied by use of the corresponding quaternary ammonium hydroxide as a reactant.

Preferably, the quaternary ammonium salt or quaternary ammonium base, as the case may be, is employed in slight excess in forming the quaternary ammonium salt of a colloidal cellulose sulfate as described above. A molar excess of quaternary ammonium reactant of 0.1 to 0.3 or greater has a tendency to drive the reaction to essential completion. This is desirable because the colloidal cellulose sulfate is the more expensive of the reactants. Completion of the reaction can be readily determined by visual observation of the mother liquor. As the quaternary ammonium cellulose sulfate product is formed, it coagulates and leaves the solution such that the remaining mother liquor becomes nearly clear and loses that portion of its viscosity which was contributed to it by the cellulose sulfate reactant. Further, the use of a slight molar excess of the quaternary ammonium reactant, e.g., 0.1 to 0.3, has, in general, been found to improve the solubility characteristics of the resulting products in a hydrocarbon oil as employed in the present invention.

The colloidal cellulose sulfate is prepared by reaction of cellulose with a complex of sulfur trioxide and a lower N-dialkyl amide. The cellulose is presoaked prior to the sulfation reaction by the addition thereto of at least an equal weight of the same lower N-dialkyl amide. Preferably the N-dialkyl amide is dimethyl formamide, although there may also be used diethyl formamide, dimethyl acetamide, diethyl acetamide, and dimethyl propionamide. An excess of the N-dialkyl amide is preferably present in the sulfation complex in addition to the premixing of the cellulose with at least an equal amount by weight of the N-dialkyl amide used in preparing the complex.

In forming the essentially undegraded colloidal cellulose sulfate, the sulfation complex which contains sulfur trioxide and a lower N-dialkyl amide at a weight ratio of about 1 to 1 should be present in the reaction mixture in an amount which is about 1 to 8 times the weight of the cellulose. The term "cellulose" includes cellulose derived from various sources and in various forms, such as chemically treated cotton linters, cellulose derived from wood, etc.

In reaction of the sulfation complex with cellulose, as described above, a reaction temperature of about 0° C. to about 25° C. is suitable, and preferably the sulfation reaction is conducted at a temperature below about 15° C. The reaction time for relatively complete esterification can range from less than 1 hour up to several hours, depending upon the reaction temperature and the relative concentrations of the reactants.

One category of quaternary ammonium cellulose sulfate compounds which can be used in our invention is denoted (I) in which there are two long chains, i.e. from about $C_{10}$ to about $C_{18}$, alkyl groups attached to the nitrogen atom in addition to two methyl groups. Examples of such quaternary ammonium cellulose sulfates are dimethyl dilauryl ammonium cellulose sulfate, dimethyl distearyl ammonium cellulose sulfate, and compounds containing mixed long-chain alkyl groups, such as dimethyl di(mixed palmityl, myristyl, and stearyl) ammonium cellulose sulfate which may also be called dimethyl di(hydrogenated tallow) ammonium cellulose sulfate. Still another example of a di(mixed alkyl) dimethyl ammonium cellulose sulfate is dimethyl di(tallow) ammonium cellulose sulfate in which the mixed long-chain alkyl groups contain some degree of unsaturation.

A secondary category (II) of quaternary ammonium cellulose sulfates are those in which three methyl groups are bonded to the nitrogen atom, together with one long-chain alkyl group, i.e., about $C_{14}$ to $C_{18}$.

Typical of such products are trimethyl tallow ammonium cellulose sulfate, trimethyl hydrogenated tallow ammonium cellulose sulfate, trimethyl stearyl ammonium cellulose sulfate, and trimethyl tall oil ammonium cellulose sulfate.

Still other categories of quaternary ammonium cellulose sulfates are (III) dimethyl monoalkyl (about $C_{12}$–$C_{18}$) monoaromatic ammonium cellulose sulfates; (IV) diaromatic monoalkyl (about $C_{12}$–$C_{18}$) methyl ammonium cellulose sulfates, and (V) methyl trialkyl (about $C_8$–$C_{18}$) ammonium cellulose sulfates. An example of a product in category (III) is dimethyl phenyl stearyl ammonium cellulose sulfate, while an example of a material in category (VI) is methyl tricaprylyl ammonium cellulose sulfate. Of the quaternary ammonium cellulose sulfates defined above, the materials in categories (I), (IV), AND (V) are preferred for use in the present invention.

The aromatic groups present in the compounds denoted (IV) above are monocyclic aromatic hydrocarbon groups containing from 6 to about 18 carbon atoms. Typical of such groups are phenyl, stearylphenyl, laurylphenyl, and dimethylphenyl groups.

The materials may be mixed in any desired sequence so long as the oil, quaternary ammonium cellulose sulfate salt, resins and resin components such as catalysts, coupling agents and the like, and solid particulate material are blended into a relatively homogeneous mass prior to injection.

In the use of the composition of the present invention, a gelled oil mixture comprising a hydrocarbon oil and quaternary ammonium cellulose sulfate salt is prepared to have a viscosity substantially the same as the viscosity of the gelled oil portion of the composition comprising the hydrocarbon oil, quaternary salt of cellulose sulfate, solid particulate matter, and polymer resins. The gelled oil mixture so prepared is injected immediately ahead of the composition containing the quaternary salt, hydrocarbon oil, particulate matter, and polymer resins so that the composition is maintained at substantially a constant viscosity during injection. In other words, contact with a leading fluid, such as water, oil, or the like, tends to result in mixing the composition with the leading fluid thereby resulting in difficulties in maintaining the resins and particulate matter in suspension. Such problems are obviated by the use of the leading mixture containing hydrocarbon oil and quaternary salt.

The composition of the present invention is then injected, and a trailing slug comprising a gelled oil mixture of hydrocarbon oil and quaternary salt in substantially the same proportions as used initially is injected. Such is necessary to prevent mixing of the trailing portions of the composition with a trailing fluid and the like.

The trailing gelled oil mixture is commonly followed with a wiper plug which is followed by oil, water, or the like. The fluid trailing the wiper plug is used to force liquid components of the composition into the formation, thereby resulting in positioning the polymer and sand about the wellbore to form a consolidated sheath in the zone of interest contacting the formation. In the practice of the present invention, water, oil, or the like is injected behind the wiper plug to force the composition into the formation until such time as the polymer and sand have entered the formation about the wellbore. The entry of the composition into the formation about the wellbore is indicated by a sudden increase in the pumping pressure necessary to pump fluid into the wellbore behind the wiper plug. Upon observing the pressure increase, pumping is stopped for a sufficient period of time to allow the resin to polymerize.

Optionally, a bit, scraper, or the like is then passed down the wellbore to remove the excess polymer and particulate material from the inside of the wellbore, and thereafter the well is ready for a return to production or the like.

Having thus described certain preferred embodiments of the present invention, it is pointed out that many variations and modifications are possible within the scope of the present invention, and it is anticipated that many such variations and modifications may be considered obvious and desirable by those skilled in the art upon a review of the foregoing description of preferred embodiments and the following examples.

EXAMPLE I

Samples of diesel oil were gelled by adding SOLOID[1] to No. 1 diesel oil and shearing it at the lowest speed in a Waring Blender until gelation occurred. Slurries were then prepared with 125 ml gelled diesel oil, 300 g 40–60 mesh sand, 25 ml resin, 2.5 ml catalyst, and 0.2 ml SILANE A1100.[2] All samples prepared made good pumpable slurries that could be used for sand control treatments in wells.

Samples of the slurries were poured into 7/8-inch diameter by 6-inch long tygon tubes and cured in a water bath at 160° F. overnight. All samples prepared with Epon 828[3] epoxy resin and DETA[4] catalyst did not harden. Apparently, the SOLOID interfered with the polymerization of the epoxy resin and prevented it from consolidating the sand. All samples that contained 33 percent DUREZ 7421A[5] resin in furfuryl alcohol and 50 percent aqueous hypophosphorous acid did harden as shown below:

[1] Trademark of Kelco Company, San Diego, Calif., for a modified cellulose, comprising a quaternary ammonium salt of cellulose sulfate.
[2] Trademark of Union Carbide Company for γ-aminopropyltriethoxysilane.
[3] Trademark of Shell Chemical Company, New Orleans, for a liquid aromatic polyepoxide comprising a reaction product of Bis-Phenol-A and epichlorohydrin.
[4] Diethylenetriamine.
[5] This is a single component hydroxy aryl aldehyde resin prepared by reacting together at 60° to 70° C. 500 grams phenol, 40 grams 37-percent aqueous solution of formaldehyde and 25 grams sodium hydroxide dissolved in 25 grams water until the formaldehyde was fully combined.

To this mixture was added 50 grams resorcinol and 50 grams 37-percent aqueous solution of formaldehyde. The resulting mixture was refluxed and dehydrated under vacuum to a viscosity of 3200 cps. The resin was then mixed with furfuryl alcohol in a ratio of 1 to 2 parts by volume to form Resin D.

| Gelled Oil | Average Compressive Strength (PSI) |
|---|---|
| Pale Oil 400[1] | 414 |
| 1 Percent SOLOID in Diesel Oil | 731 |
| ¾ Percent SOLOID in Diesel Oil | 647 |
| ½ Percent SOLOID in Disel Oil | 694 |

[1] Pale Oil - a refined paraffinic mineral oil having an API gravity of 30.0, a C/H ratio of 6.3, a molecular weight 482, a SSU viscosity at 100° F of 399.3, at 210° F of 57.61, a pour point of 0° F, and an ASTM color of 2.

These data demonstrate that the gelled oil based systems having acid catalysts solidify to form quite satisfactory structures whereas the based catalyzed compositions do not solidify and are unsuitable.

Diesel oil gelled with SOLOID maintains its viscosity after exposure to 160° F. for at least 19 hours, but with the addition of 1 percent by weight of 50 percent aqueous hypophosphorous acid, the viscosity is reduced significantly with time, which will allow easy cleanup of the oil after the treatment. For instance, the initial viscosity of 2 percent SOLOID in diesel oil with 1 percent acid is 47 cp at room temperature measured with a viscometer[2] at 300 rpm. After being cured at 160° F. for 6 hours, the room temperature viscosity of the same sample was 13 cp. The same gelled diesel oil with 2 percent SOLOID without any acid had an initial viscosity of 36 cp and after curing at 160° F. for 6 hours had 84 cp viscosity at room temperature.

[2] Fann Model 35 concentric cylinder rotational viscometer manufactured by Fann Instrument Corporation, Houston, Texas.

Other oil gelling agents have been tested for the purpose of suspending sand and resins for treating wells to control formation sand production but were found to be incompatible with the resins.

EXAMPLE 2

In a test using CAB-O-SIL[1] as a gelling agent, 125 ml of gelled diesel oil, 300 g of 40–60 mesh sand, 50 ml of 80 percent DUREZ[2] 7421A resin in furfuryl alcohol, 10 ml 12119 DUREZ[2] catalyst, and 0.2 ml SILANE A1100 were mixed. Immediately after adding the SILANE A1100, the gel broke, and the oil would not suspend the sand. This mixture, therefore, could not be pumped into a wellbore.

Another test used Sodium Palmitate and NaOH to gel the diesel oil. A slurry was mixed with 125 ml of the gelled diesel oil, 300 g 40–60 mesh sand, 50 ml of Dowell's K70-K71[3] resin, 3 ml 25 percent aqueous NaOH, and 0.2 ml SILANE A1100. The K70-K71 resin was added last to this slurry, and as it was added, the gel broke, rendering the slurry unpumpable.

[1] Trademark of Cabot Corporation, Boston, Mass., for proprietary treated silica thickeners.
[2] Trademark of Hooker Chemical Corporation, North Tonawanda, N.Y.
[3] Trademark of Dow Chemical Company, Midland, Mich., for phenol formaldehyde resins.

Another slurry was prepared using the same gelled diesel oil as above wherein 125 ml of the gelled oil was mixed with 300 g of 40–60 mesh sand, 25 ml of 80%, DUREZ 7421A resin in furfuryl alcohol, 1 ml of DUREZ 12119 catalyst, and 0.2 ml SILANE A1100. The gel broke immediately when the resin was added.

Another test used Aluminum Stearate and NaOH to gel the diesel oil. One slurry of 125 ml gelled diesel oil, 300 g 40–60 mesh sand, 25 ml 80 percent DUREZ 7421A resin in furfuryl alcohol, 1 ml DUREZ 12119 catalyst, and 0.2 ml SILANE A1100 was prepared. Another slurry was mixed using 125 ml gelled diesel oil, 300 g 40–60 mesh sand, 25 ml 33 percent 7421A resin in furfuryl alcohol, 1 ml DUREZ 12119 catalyst, and 0.2 ml SILANE A1100. The gelled diesel oil in these slurries maintained its viscosity so that they were pumpable, and they were cured at 120° F. for 3 days. Neither composition had any measurable compressive strength. Thus, the Aluminum Stearate system apparently interfered with the normal reaction of the resins.

Diesel oil gelled with BAROGEL[(1)] was also tested by mixing 25 g BAROGEL in 75 ml diesel oil in a Waring Blender for 30 minutes, adding 10 ml methanol and 725 ml diesel oil, and mixing another 30 minutes. The result was an extremely thick, grease-like gel that needed to be diluted with diesel oil to make a practical sand control slurry. A test was performed by adding 300 g of 40–60 mesh sand to 100 ml of the gelled diesel oil diluted with 25 ml of diesel oil. Then 25 ml of 80 percent DUREZ 7421A resin in furfuryl alcohol, 1 ml DUREZ 12119 catalyst, and 0.2 ml SILANE A1100 were added to the slurry. This made a pumpable slurry, but after four days' curing at 160° F., the resin had not hardened. Apparently, the BAROGEL interfered with the normal reaction of the resin.

[(1)] Trademark of National Lead Industries of Houston, Tex., for treated bentonite gelling agents.

Further attempts to make the BAROGEL system work also resulted in failure of the resin to harden. In one attempt, 300 ml of diesel oil was blended with 25 ml of BAROGEL and 5 ml methanol for 30 minutes in a Waring Blender. A slurry was then made with 100 ml of the resulting gelled diesel oil diluted with 100 ml of diesel oil to which was added 300 g of 40–60 mesh sand, 25 ml 80 percent DUREZ 7421A resin in furfuryl alcohol, 2 ml 12119 DUREZ accelerator, and 0.2 ml SILANE A1100. This slurry was cured at 160° F. for four days with the same result, even though the catalyst concentration was doubled.

Another attempt was made by mixing 25 g of BAROGEL and 300 g diesel oil in the Waring Blender for 30 minutes, then adding 5 ml methanol and 400 ml diesel oil. This made a thinner fluid but was still capable of suspending the sand. To 100 ml of this gelled diesel oil was added 300 g of 40–60 mesh sand, 25 ml 80 percent DUREZ 7421A resin in furfuryl alcohol, 2 ml 12119 DUREZ catalyst, and 0.2 ml SILANE A1100. This slurry was also cured at 160° F. for 4 days, and the resin again did not set.

These tests indicate that conventional oil gelling agents cannot be used in conjunction with resins, catalysts, or coupling agents (such as SILANE) required to make a slurry that can be easily pumped into a well and placed in contact with a subterranean formation where, with time and temperature conditions normally encountered, the resin will harden, forming a permeable consolidated sand filter that will stop formation sand movement and allow formation fluids to be produced. The composition of the present invention is effective providing a means of accomplishing these ends when used as described herein.

EXAMPLE 3

460 gallons of diesel fuel and 32.2 pounds of SOLOID thickener is mixed until the viscosity is about 1000 cps at a shear rate of 10 sec$^{-1}$ to produce a gelled oil. 250 gallons of the gelled oil is left in the mixer, and the remaining 210 gallons is placed in a storage tank. 3,750 pounds of 40–60 U.S. mesh sand is mixed with the 250 gallons of gelled oil. 37.5 pounds of a resin consisting of 33 weight percent phenolformaldehyde and 67 weight percent furfuryl alcohol, 0.5 gallon of SILANE A1100 and 3.75 gallons of a 50 weight percent aqueous solution of hypophosphorus acid to form an injection mixture. After mixing for 10 minutes, 126 gallons of gelled oil from the storage tank is pumped into the well followed by the injection mixture, followed by 84 gallons of gelled oil from the storage tank. The gelled oil is displaced by a wiper plug and followed with ungelled diesel oil. Additional diesel oil is injected to displace the injection mixture into the formation and pack the sand tightly against the formation (indicated by a sudden increase in the pressure required to pump the diesel oil). Pumping is then stopped and the resin allowed to harden. A bit and scraper is then lowered into the well, and the excess plastic and sand is removed from the inside of the wellbore.

Having thus described the invention, we claim:

1. A composition for positioning an acid-settable polymeric material having particulate matter disposed therein in contact with a subterranean formation penetrated by a wellbore, said composition consisting essentially of:
   (a) a substantially neutral hydrocarbon oil;
   (b) a quaternary ammonium salt of cellulose sulfate, the quaternary ammonium group of said quaternary salt of cellulose sulfate containing at least 16 carbon atoms and being present in said composition in an amount sufficient to produce a minimum apparent viscosity in said composition of at least 50 cps, but less than 5000 cps at the injection temperature and pressure and an apparent minimum viscosity at bottom hole conditions of at least 25 cps;
   (c) finely-divided solid particulate material in an amount equal to from about 0.25 to about 22 pounds of particulate matter per gallon of said oil; and,
   (d) an acid-settable liquid thermosetting resin in an amount equal to from about 0.1 to about 5.0 gallons per ft$^3$ of said particulate material.

2. The composition of claim 1 wherein said cellulose sulfate is an essentially undegraded cellulose sulfate and wherein the composition also contains an effective amount of a coupling agent.

3. The composition of claim 1 wherein said cellulose sulfate has a degree of substitution of about 2.0 or higher, said cellulose sulfate having a viscosity of 20 cps or higher at 1.0 weight percent concentration in an aqueous media as measured by a Brookfield Synchro-Lectric Viscometer, Model LVF at 60 rpm and a temperature of 25° C., said cellulose sulfate being further characterized as reactive with potassium ions to form a thermoreversible gel.

4. The composition of claim 1 wherein said quaternary ammonium portion of said quaternary salt contains:
   (a) two long-chain alkyl groups each having from about 10 to about 18 carbon atoms and two methyl groups;
   (b) three methyl groups together with one long-chain alkyl group having 14 to 18 carbon atoms;
   (c) two methyl groups, one alkyl group having 12–18 carbon atoms and one monocyclic aromatic hydrocarbon group having 6 to 18 carbon atoms;

(d) two monocyclic aromatic hydrocarbon groups with each of said aromatic groups containing from 6 to 18 carbon atoms, one alkyl group having 12–18 carbon atoms and one methyl group; or (e) one methyl group and three long-chain alkyl groups with each of said alkyl groups containing from 8 to about 18 carbon atoms.

5. The composition of claim 1 wherein said composition consists essentially of:

(a) a substantially neutral hydrocarbon oil;

(b) a quaternary ammonium salt of an essentially undegraded, cellulose sulfate having a degree of substitution of about 2.0 or higher, said cellulose sulfate having a viscosity of 20 cps or higher at 1.0 weight percent concentration in an aqueous media as measured by a Brookfield Synchro-Lectric Viscometer, Model LVF at 60 rpm and a temperature of 25° C., said cellulose sulfate being further characterized as reaction with potassium ions to form a thermoreversible gel, said quaternary ammonium group of said salt containing:

(1) two long-chain alkyl groups each having from about 10 to about 18 carbon atoms and two methyl groups, (2) three methyl groups together with one long-chain alkyl group having 14 to 18 carbon atoms;

(3) two methyl groups, one alkyl group having 12–18 carbon atoms and one monocyclic aromatic hydrocarbon group having 6 to 18 carbon atoms;

(4) two monocyclic aromatic hydrocarbon groups with each of said aromatic groups containing from 6 to 18 carbon atoms, one alkyl group having 12–18 carbon atoms and one methyl group; or, (5) one methyl group and three long-chain alkyl groups with each of said alkyl groups containing from 8 to about 18 carbon atoms said quaternary salt being present in said composition in an amount sufficient to produce a minimum apparent viscosity in said composition of at least 50 cps but less than 5000 cps at 25° C. and one atmosphere and an apparent viscosity in said composition at bottom hole conditions of at least 25 cps;

(c) finely-divided solid particulate material in an amount equal to from about 0.25 to about 22 pounds of particulate material per gallon of said oil; and, (d) an acid-settable liquid thermosetting resin in an amount equal to from about 0.1 to about 5.0 gallons per ft$^3$ of said particulate material.

6. The composition of claim 1 wherein said resin is selected from the group consisting of acid-settable polyepoxides, acid-settable polyesters, phenolic novolaks, hydroxy aryl-aldehydes, furans, furfuryl alcohol resins, and acid-settable polyurethanes and the composition also contains an effective amount of a coupling agent.

7. The compoisition of claim 6 wherein said resin is selected from the group consisting of phenolic novolaks, hydroxy aryl aldehydes, furans and furfuryl resins.

8. The composition of claim 6 wherein said resin is present in an amount equal to from about 1.0 to about 2.0 gallons of resin per ft$^3$ of particulate material.

9. The composition of claim 6 wherein said quaternary salt of cellulose sulfate is present in an amount equal to from 0.03 to about 5.0 weight percent based on the weight of the composition.

10. The composition of claim 6 wherein the coupling agent is γ-aminopropyltriethoxysilane, the resin is a hydroxy aryl aldehyde resin, and the particulate material is siliceous sand.

* * * * *